United States Patent Office 3,453,307
Patented July 1, 1969

3,453,307
METHOD FOR PREPARATION OF ISOPROPENOXY-SILICON COMPOUNDS
Siegfried Nitzsche and Paul Buchheit, Burghausen, Upper Bavaria, Germany, assignors to Wacker-Chemie G.m.b.H., Munich, Bavaria, Germany
No Drawing. Filed Sept. 26, 1966, Ser. No. 581,746
Claims priority, application Germany, Oct. 1, 1965, W 40,025
Int. Cl. C07f 7/18, 7/02, 7/08
U.S. Cl. 260—448.8     5 Claims This invention relates to a novel method for preparing isopropenoxysilanes and siloxanes. More particularly, this invention is directed to introducing $$CH_2=C(CH_3)O-$$

radicals into silanes, siloxanes and organosilicon compounds generally.

The use of alkoxysilanes and alkoxysiloxanes in water repellent treatments for fabrics and paper, in room-temperature vulcanizing silicon rubber formulations, as sizing agents and priming agents on a wide variety of surfaces such as glass, glass fibers and glass fabrics is well known and has increased greatly in recent years. Generally, the alkoxy group can be introduced into the silicon compounds by a straightforward alcoholysis of the corresponding chlorosilicon compound. Thus, methyl alcohol reacts with chlorosilanes to produce the corresponding methoxysilane. However, the isopropenoxy silicon compounds cannot be produced by this reaction because isopropenyl alcohol exists only as the enolform of acetone and is present in extremely small proportions in tautomeric equilibrium with the ketoform.

It is known that acetone reacts with chlorosilicon compounds forming hydrogen chloride. The hydrogen chloride affects conversion of the acetone to higher molecular weight species of ketones, oxyketones and olefinic compounds. The ketones, oxyketones and olefinic compounds so formed can further react with the chlorosilicon compounds. However, the formation of isopropenoxy silicon compounds in appreciable yield is not accomplished in this reaction.

It has been proposed to prepare isopropenoxy silicon compounds by reacting chlorosilicon compounds with acetone mercury chloride. This method of preparation suffers from several serious difficulties such as unsatisfactorily small yields of product, the difficulty and expense involved in obtaining the mercury compound, the necessity for recovering the mercury when carrying out the procedure in large scale operations and the toxicity of the mercury and its compounds.

It is the object of this invention to produce the desired isopropenyloxysilicon compounds employing a relatively simple and inexpensive reaction. Avoidance of the difficulties previously encountered in the preparation of isopropenyloxysilicon compounds is also an object. Other objects and advantages of this invention are detailed in or will be apparent from the following disclosure and description of the invention.

This invention comprises reacting a silicon chloride compound with metallic sodium and acetone to produce the corresponding isopropenyloxysilicon compounds.

Any silicon compound whether monomeric or polymeric can be employed herein so long as it contains at least one chlorine atom bonded directly to silicon in each molecule. The preferred silicon compounds are those having organic radicals bonded to silicon through Si—C bonds in addition to the silicon bonded chlorine atoms. In addition to the chlorine substituents and organic radicals bonded to Si, the operable chlorosilicon compounds can have oxygen atoms and/or divalent hydrocarbon radicals bonding adjacent silicon atoms as in ≡Si—O—Si≡ siloxane linkages and ≡SiCH₂Si≡ and ≡SiC₆H₄Si≡ silcarbane linkages.

The organic radicals bonded to Si can be hydrocarbon radicals, fluorohydrocarbon radicals, cyanoalkyl radicals, radicals composed of carbon, hydrogen and oxygen wherein the oxygen atoms are present as ether linkages and fluorohydrocarbon ether radicals. Preferably the organic substituents are hydrocarbon or fluorohydrocarbon radicals and the most preferred substituents are methyl, phenyl, vinyl, and 3,3,3-trifluoropropyl. Examples of the organic radicals which can be bonded to silicon in the silicon chlorides operable herein include alkyl radicals such as ethyl, isopropyl, isobutyl, tertiary butyl, 2-ethylhexyl, dodecyl, octadecyl and myricyl; alkenyl radicals such as vinyl, allyl and hexadienyl; cycloaliphatic radicals such as cyclopentyl, cyclohexyl, cyclopentenyl, and cyclohexenyl; aryl radicals such as phenyl, naphthyl and xenyl radicals; aralkyl radicals such as benzyl, phenylethyl and xylyl radicals; alkaryl radicals such as tolyl, ethylphenyl and dimethylphenyl as well as fluoronated derivatives of the foregoing hydrocarbon radicals such as 3,3,3-trifluoropropyl, α,α,α-trifluorotolyl, 3,3,4,4,5,5,5-heptafluoropentyl and 5,5,5-trifluoro-2-trifluoromethylamyl. The divalent hydrocarbon and hydrocarbon ether radicals which can be present as linkages between silicon atoms include alkylene radicals such as methylene and n-propylene; arylene radicals such as phenylene, methoxyphenylene, and 4,4'-diphenylether; —C₆H₄CH₂C₆H₄—, and $$-(CH_2)_2-C_6H_4-(CH_2)_2-$$

The preferred organosilicon chlorides employed herein are the silanes of the general formula $R_nSiCl_{4-n}$ wherein each R is a monovalent hydrocarbon radical as illustrated above and n is 0, 1, 2 or 3 and the equivalent siloxanes of the general unit formula $$R_xSiCl_yO_{\frac{4-x-y}{2}}$$

wherein R is as above defined, x is 0, 1, 2 or 3, y is 0, 1, 2 or 3, the sum of x+y is 0, 1, 2 or 3, there being an average of from 0.9 to 2.5 R groups per silicon atom and at least 1 chlorine atom in each molecule of the siloxane.

Also operable herein are chlorosilcarbanes of the general unit formula $$R_xCl_ySiR'_{\frac{4-x-y}{2}}$$

wherein R, x and y are as above defined and R' is a divalent hydrocarbon or hydrocarbon ether radical. Silicon polymers having both siloxane units $$R_xCl_ySiO_{\frac{4-x-y}{2}}$$

and silcarbane units $$R_xCl_ySiR'_{\frac{4-x-y}{2}}$$

can also be employed. In the siloxane and silcarbane polymers the organic substituents represented by R can all be the same as in α,ω-dichlorodimethylpolysiloxane $$[Cl[(CH_3)_2SiO]_xSi(CH_3)_2Cl$$

x is an integer] or they can be different in the same or different units as in dimethylsiloxanediphenylsiloxane copolymers and phenylmethylsiloxane homopolymers. The chlorine atoms can be present on terminal silicon atoms or anywhere along the polymeric molecule. In short, the only critical features of the chlorine substituted silicon compounds employed herein are: (1) The operable compounds must contain chlorine bonded to silicon. (2) The operable compounds should not contain substituents which are reactive to the sodium and acetone reactants employed herein under the conditions of the reaction.

The silanes, siloxanes, silcarbanes and other silicon chloride compounds employed herein are prepared by methods well known and widely documented in the art.

The sodium is employed in finely-divided form. Preferably one gram-atom of sodium is employed for each gram equivalent of chlorine bonded to silicon in the silicon chloride compounds. When less than one gram-atom of sodium is employed per gram-atom of chlorine present, the yield of product is reduced. Excess quantities of sodium produce no advantage. The degree of division of the sodium is not critical but the more finely divided the metal is, the more rapid will be the reaction. The sodium is advantageously employed in dispersion in an inert organic fluid such as aliphatic hydrocarbon solvents, aromatic hydrocarbon solvents and ethers, including but not limited to ligroin, toluene, xylene, and diethylether.

Expediently, one gram mol of acetone is employed per gram equivalent of silicon bonded chlorine in the silicon compounds employed as a reactant. Again, smaller proportions of acetone can be employed but at the cost of reducing the yield of product and larger proportions of acetone can be employed but with no advantage. Accordingly, stoichiometric amounts of sodium and acetone are employed based on the amount of chlorine bonded to silicon in the silicon chloride reactant.

The use of organic solvents which are inert and fluid under reaction conditions is recommended but is not required. The solvents assure adequate mixing and contact among the reactants and reduce localized reactions. Again, the solvents employed can be aliphatic hydrocarbons, aromatic hydrocarbons and ethers as illustrated by ligroin, toluene, xylene, diethylether, di-n-butylether and tetrahydrofuran.

The reaction is accomplished by mixing the three reactants. It is preferred to simultaneously add the sodium and acetone in chemically equivalent proportions to the silicon-chlorine compound. Thus, the finely-divided sodium can be dispersed in a solvent, e.g. toluene, the acetone can be dispersed in a solvent and the resulting dispersion and solution can be added to the silicon chlorine compound in solution and previously charged to the reaction vessel. Thorough stirring of the reactants is desirable.

The reaction is exothermic and external cooling of the reaction vessel is preferred. It is preferred to keep the reaction temperature below +10° C. and any temperature not exceeding +10° C. and above the freezing point of the fluid reactants can be employed. The reaction pressure is not critical and super-atmospheric pressure or subatmospheric pressure can be employed but atmospheric pressure is preferred. The reaction employed herein can be carried out as a batch process or as a continuous process.

It is desirable to carry out the reaction of this invention in an inert atmosphere particularly excluding water and oxygen. This is particularly significant in view of the presence of hydrolyzable chlorine in the silicon chloride compound and because of the use of finely-divided metallic sodium.

It is believed the reaction occurring herein can be described by the generalized equation:

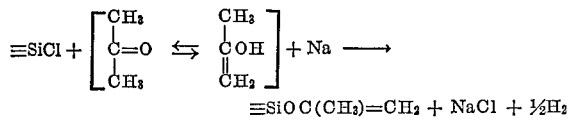

$$\equiv SiOC(CH_3)=CH_2 + NaCl + \tfrac{1}{2}H_2\uparrow$$

The reaction product is isolated from the reaction mass by separating the by-produced sodium chloride, by simple filtration or any other desired method, and distilling the inert solvent from the reaction mass.

The isopropenoxy silicon compounds possess the advantage over other alkoxy silicon compounds in that they are considerably easier and more rapid to hydrolyze and will condense with silanol groups, for instance, more rapidly. The isopropenoxy silicon compounds possess the advantage over other readily hydrolyzable silicon compounds such as chloro- and acetoxy silanes in that the acetone formed as a side product during hydrolysis and condensation is not corrosive, not toxic and more readily volatile than the side products created by the hydrolysis of many other readily hydrolyzable silicon compounds.

The isopropenoxy silicon compounds of the present discovery can be used anywhere where hydrolyzable silicon compounds are required, viz., for preparing organopolysiloxanes which are hardenable to elastomers or resin-like articles at room temperature, which may be stored in the absence of water and cured upon the addition of water.

The following examples are included herein to assist those skilled in the art to obtain a better understanding of the invention. The scope of the invention is not limited by the examples but is delineated in the claims.

The steps described in the following examples are carried out at room temperature, i.e., at about 20° C. and without external heat—with the exception of distilling off the solvent and at normal pressure, i.e., at about 760 mm./Hg abs., insofar as not otherwise stated.

Example 1

Working in a two liter flask equipped with a high-speed stirrer, two graduated dropping funnels, a gas outlet, a thermometer and gas inlet tube, 500 ml. of a dispersion of 69 g. metallic sodium in toluene are added from the one dropping funnel and 180 g. acetone diluted to 500 ml. with toluene are added at the same time in two equally thin streams to 149.5 g. methyltrichlorosilane in 200 g. toluene under nitrogen and while stirring. The content of the flask is kept at a temperature in the range of +5° C. to +10° C. by external cooling. The hydrogen developed by the reaction as well as nitrogen exit through the gas outlet.

After hydrogen development has terminated, the reaction mass filtered from the cooking salt and the toluene is distilled from the filtrate. 200 g. of a yellowish thin fluid oil was obtained and was analyzed. The molecular weight of the product was 214.

*Analysis.*—Found: 13.0% by weight Si; 56.0% by weight C. Calculated: 13.11% by weight Si; 56.0% by weight C.

The product obtained was $CH_3Si[OC(CH_3)=CH_2]_3$.

Example 2

The process described in Example 1 was repeated with the exception that 161.5 g. vinyltrichlorosilane was used in place of the methyltrichlorosilane. 220 g. of a yellowish thin fluid oil was obtained. A molecular weight of 225 to 230 was determined for this product.

*Analysis.*—Found: 12.3% by weight Si; 58.4% by weight C. Calculated: 12.42% by weight Si; 58.38% by weight C.

The product obtained was the compound of the formula $CH_2=CHSi[OC(CH_3)=CH_2]_3$.

Example 3

Working in the apparatus described in Example 1, 350 ml. of a dispersion of 46 g. metallic sodium in toluene from the one dropping funnel and 116 g. acetone diluted to 350 ml. with toluene were added simultaneously in two equally thin streams to 189 g. of sym-tetramethyl-tetrachlorocyclotetrasiloxane, $[CH_3ClSiO]_4$, in 400 ml. toluene under nitrogen with continuous stirring. The temperature of the contents was kept at +5° C. to +10° C. by external cooling of the flask.

After the development of hydrogen had terminated, the reaction mass filtered to remove the by-produced salt and the toluene was distilled from the filtrate. 226 g. of a yellowish oil was obtained. A molecular weight of 460–470 was determined for this substance.

*Analysis.*—Found: 24.1% by weight Si; 41.3% by weight C. Calculated: 24.19% by weight Si; 41.38% by weight C.

The product was thereby confirmed as a cyclic siloxane tetramer of the formula

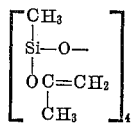

Example 4

Employing the apparatus and method of Example 1, the following chlorine-silicon compounds were reacted to produce the indicated product:

| Chloro-silicon compound | Product |
|---|---|
| $Cl[(CH_3)_2SiO]_{50}Si(CH_3)_2Cl$ | $CH_2=C(CH_3)O[(CH_3)_2SiO]_{50}$-$Si(CH_3)_2$—$OC(CH_3)=CH_2$ |
| $CH_3C_6H_5SiCl_2$ | $CH_3C_6H_5Si[OC(CH_3)=CH_2]_2$ |
| $CF_3CH_2CH_2(CH_3)SiCl_2$ | $CF_3CH_2CH_2Si[OC(CH_3)=CH_2]_2$<br>$\phantom{xxxxx}|$<br>$\phantom{xxxxx}CH_3$ |
| $Cl_2CH_3SiO[(CH_3)_2SiO]_{25}SiCH_3Cl_2$ | $[CH_2=(CH_3)CO]_2CH_3SiO$<br>$\phantom{xx}](CH_3)_2SiO[_{25}SiCH_3]OC$-<br>$\phantom{xxxxx}(CH_3)=CH_2]_2$ |
| $Cl_2SiO[(CH_3)_2SiO]_{25}Si(CH_3)$-<br>$(CH=CH_2)Cl$ | $[CH_2=(CH_3)CO]_2SiO[(CH_3)_2$-<br>$SiO]_{25}Si(CH_3)(CH=CH_2)$-<br>$(OC(CH_3)=CH_2)$ |

That which is claimed is:
1. A method for introducing isopropenoxy groups into silicon compounds comprising admixing a silicon compound having at least one chlorine atom bonded to silicon in each molecule with metallic sodium and acetone in an essentially inert atmosphere, at a temperature not exceeding $+10°$ C.
2. The method of claim 1 further characterized in that the reactants are each dissolved or dispersed in an inert fluid solvent.
3. The method of claim 1 further characterized in that the silicon compound reactant is selected from the group consisting of silanes of the general formula $R_nSiCl_{4-n}$, siloxane polymers of the general unit formula $$R_xSiCl_yO_{\frac{4-x-y}{2}}$$

and silcarbane polymers of the general unit formula $$R_xSiCl_yR'_{\frac{4-x-y}{2}}$$

where each R is a monovalent hydrocarbon radical, a monovalent hydrocarbon ether radical, or a fluorine derivative of the hydrocarbon and hydrocarbon ether radicals, $n$ is 0, 1, 2 or 3, $x$ is 0, 1, 2 or 3, $y$ is 0, 1, 2, or 3, $x+y$ is 0, 1, 2 or 3, R' is a divalent hydrocarbon or hydrocarbon ether radical, said siloxane and silcarbane polymers having at least one chlorine atom per molecule.
4. The method of claim 1 further characterized in that the silicon compound reactant is a silane of the general formula $R_nSiCl_{4-n}$ or a siloxane of the average unit formula $$R_xCl_ySiO_{\frac{4-x-y}{2}}$$

where each R is an alkyl radical, a phenyl radical or a vinyl radical, $n$ is 0, 1, 2 or 3, $x$ is 1 or 2, $y$ is 0 or 1 and $x+y$ is 0, 1, 2 or 3, said siloxane containing at least one chlorine atom per molecule.
5. The method of claim 1 further characterized in that the sodium and acetone are employed in proportions of about 1 gram of Na and 1 gram mol of acetone per gram equivalent of chlorine bonded to silicon in the silicon compound.

No references cited.

TOBIAS E. LEVOW, *Primary Examiner.*

P. F. SHAVER, *Assistant Examiner.*

U.S. Cl. X.R.

106—13; 117—24; 260—2, 46.5